United States Patent [19]

Curley et al.

[11] Patent Number: 5,027,271
[45] Date of Patent: Jun. 25, 1991

[54] APPARATUS AND METHOD FOR ALTERABLE RESOURCE PARTITIONING ENFORCEMENT IN A DATA PROCESSING SYSTEM HAVING CENTRAL PROCESSING UNITS USING DIFFERENT OPERATING SYSTEMS

[75] Inventors: John L. Curley, North Andover; Thomas S. Hirsch, Bedford; David A. Wurz, Winchester, all of Mass.

[73] Assignee: Bull HN Information Systems Inc., Billerica, Mass.

[21] Appl. No.: 136,056

[22] Filed: Dec. 21, 1987

[51] Int. Cl.$^5$ .............................................. G06F 15/16
[52] U.S. Cl. ................... 364/200; 364/228.8; 364/239.3; 364/240.1; 364/281.6
[58] Field of Search ... 364/200 MS File, 900 MS File

[56] References Cited

U.S. PATENT DOCUMENTS

| | | | |
|---|---|---|---|
| 4,253,146 | 2/1981 | Bellamy et al. | 364/200 |
| 4,559,614 | 12/1985 | Peek et al. | 364/900 |
| 4,608,631 | 8/1986 | Stiffler | 364/200 |
| 4,722,048 | 1/1988 | Hirsch et al. | 364/200 |
| 4,843,541 | 6/1989 | Bean et al. | 364/200 |

Primary Examiner—Gareth D. Shaw
Assistant Examiner—John C. Loomis
Attorney, Agent, or Firm—Faith F. Driscoll; John S. Solakian; William W. Holloway

[57] ABSTRACT

In a data processing system having a plurality of non-homogeneous central processing units, apparatus is disclosed that permits a central processing unit not having mechanisms for protection of the allocation of resources to be coupled to the data processing system while preserving a peer relationship among the central processing units. The protection apparatus is interposed between the coupled central processing unit and the system bus and reviews each access to data processing system resources to insure that the accessed system resource is available to the associated data processing system. In addition, the apparatus permits initialization procedures without interprocessor conflict, provides status information from the coupled central processing unit to a requesting central processing unit and permits selected control signals to be applied to the coupled central processing unit.

22 Claims, 8 Drawing Sheets

APPARATUS AND METHOD FOR ALTERABLE RESOURCE PARTITIONING ENFORCEMENT IN A DATA PROCESSING SYSTEM HAVING CENTRAL PROCESSING UNITS USING DIFFERENT OPERATING SYSTEMS

RELATED APPLICATIONS

The following U.S. Patent Applications are related applications to the present invention APPARATUS AND METHOD FOR A DATA PROCESSING SYSTEM HAVING A PEER RELATIONSHIP AMONG A PLURALITY OF CENTRAL PROCESSING UNITS; invented by John L. Curley, Thomas S. Hirsch, John C. Penney, Ileana S. Reisch; Theodore R. Staplin, Jr., and David A. Wurz; having Ser. No. 07/136,055; filed on Dec. 21, 1987 and assigned to the assignee of the present U. S. Patent Application.

APPARATUS AND METHOD FOR ACCESS TO USER PROGRAMS CONTROLLED BY A FIRST OPERATING SYSTEM BY USERS INTERACTING WITH A DATA PROCESSING SYSTEM THROUGH A SECOND OPERATING SYSTEM; invented by John L. Curley, Thomas S. Hirsch, John C. Penney, Ileana S. Reisch; James M. Sandini, Theodore R. Staplin, Jr., and ,David A. Wurz; having Ser. No. 07/136,058; filed on Dec. 21, 1987 and assigned to the assignee of the present U.S. patent application.

BACKGROUND OF THE INVENTION

1. Field of the Invention

This invention relates generally to data processing systems and more particularly to data processing systems having a plurality of central processing units.

2. Description of the Related Art

In order to increase the processing capability of data processing systems, one technique has been to couple additional central processing units to the data processing system. The ability to select the number of central processing units in a data processing system permits an efficient matching of the capabilities of the system to the data processing requirements. Data processing having a plurality of central processing systems typically have one of two configurations. Referring now to FIG. 1A, a data processing system 10 having a plurality of central processing units, according to a first implementation found in the related art, is shown. The data processing system 10 includes a plurality of central processing units 11-12 coupled to a system bus 19. The central processing units 11-12 perform the actual manipulation of data groups under control of operating and user software programs. The main memory unit 16, also coupled to the system bus 19, stores the data and program signal groups which are currently being used by the central processing units. The input/output processing units 14-15, coupled to the system bus 19, include devices for storage of large quantities of data and program signal groups, e.g., disk storage devices, terminals for the entry of data by system users, and communication devices for exchange of data and program signal groups with remote locations. The system bus 19 provides the principal path for the exchange of data and program signal groups between the components of the data processing system 10.

Referring next to FIG. 1B, a second implementation of a multiprocessor data processing system, according to the related art, is shown. Generally, the same components are available to perform the processing functions as in FIG. 1A except that the components are coupled by a memory control unit 14 instead of by the system bus 19. The memory control unit 14 is typically an electronic switch providing the coupling of the data processing system 10' components in response to control signals. The memory control unit 14 can also provide functionality, such as conflict resolution, that would typically be distributed in the bus oriented data processing system.

The data processing systems of FIG. 1A and FIG. 1B are typically implemented in the related art such that the central processing units are homogeneous. In a homogeneous data processing system, the operating systems are the same or similar, the implementing apparatus is the same or similar and the operations performed on apparatus external to the data processing system is the same or similar. Even though the central processing units are homogeneous, substantial efforts are employed to prevent conflicts between the central processing units, thereby preventing conflicts between different activities for the data processing system resources. For example, one of the central processing systems can be selected to allocate resources and tasks among the plurality of central processing units. The resources of the system are the storage devices, terminals, main memory locations and other data processing facilities to which a central processing unit has access for the purpose of performing the data processing functions. This relationship is generally referred to as the master/slave relationship because of the control asserted by the selected processor. However, some data processing systems can be designed wherein the central processing units, operating under control of the same operating system, can operate under as equal members (as contrasted with the master/slave relationship) of the data processing system. The following references provide examples of the way in which a plurality of central processing units can be incorporated in a data processing system without a master/slave relationship while avoiding system resource access conflicts.

In U.S. Pat. No. 3,631,405, issued Dec. 28, 1971, entitled SHARING OF MICROPROGRAMS BETWEEN PROCESSORS and invented by G. S. Hoff and R. P. Kelly, two microprogrammed processing units share control elements that permit sharing of microprogram repertoires. By appropriate invocation of the operating system, the control signals from a first microprogrammed processing unit are transferred to the second microprogrammed processing unit. In fact, this configuration can best be described as a single processing unit with resources allocated by a supervisor controlled operating system. The use of a supervisor program as well as the coupling between the two processing units distinguishes this configuration from the peer processing unit relationship described in the present invention.

In U.S. Pat. No. 4,131,941, issued Dec. 26, 1978, entitled LINKED MICROPROGRAMMED PLURAL PROCESSOR UNIT and invented by H. L. Siegel, G. F. Muething, Jr., and E. J. Radkowski, a configuration of a plurality of processors is described that permits the processors to act independently or to be reconfigured so that a master/slave relationship can be invoked. The plurality of processors are linked together and, even when operating in a mode described as being independent, are not independent but subject to a supervisory control structure for configuration determination and for allocation of activity. Of course, the control of the allocation of activities implies the control of the allocation of resources. In addition, the data processing system described by this U.S. Patent, either has one operating system or a plurality of identical operating systems. The invention of the U.S. Patent appears to be best described as a single data processing system with a controllable configuration. The present invention is directed to central processing units having different operating systems that can function independently.

In U.S. Pat. No. 4,200,930, issued on Apr. 29, 1980, entitled ADAPTER CLUSTER MODULE FOR DATA COMMUNICATIONS SUBSYSTEM invented by R. L. Rawlings and R. D. Mathews, a host processing unit can have a plurality data communications subsystems coupled thereto for performing routine communications functions with incoming and outgoing signals. Although the data communications subsystems are capable, in case of a failure of the host processing unit, of continuing communications, the role of the host processing unit to the data communications subsystems is clearly that of a master/slave relationship. The peer processor relationship is not applicable because the data communications subsystems do not have access to all the resources available to the host processing unit.

In U.S. Pat. No. 4,722,048, issued on Jan. 26, 1988, entitled MICROCOMPUTER SYSTEM WITH INDEPENDENT OPERATING SYSTEMS, invented by T. S. Hirsch, J. W. Stonier and T. 0. Holtey, two processors, an LSI-6 processor with a MOD400 operating system and an Intel 8086 processor with either and MS-DOS or a CPM-86 operating, share the processing responsibilities (a Motorola 6809 microprocessor is also included, but generally functions as an input/output controller). The LSI-6 processor has memory space that is not accessible to the Intel 8086 processor. In addition, the input/output operations performed by the 6809 microprocessor can be initiated only by the LSI-6 processor, so that the Intel 8086 has access to this resource only through the intervention of the LSI-6 processor, a form of a master/slave relationship.

In U.S. Patent Application Ser. No. 06/859,593, filed on May 5, 1986, entitled MULTIPROCESSOR SYSTEM ARCHITECTURE, invented by C. Fiacconi et al, the communication of two processors is described. In this application, the sharing of memory without interference is accomplished by controlling buses associated with each processor system. The buses are coupled to particular areas of memory and, for one processor to access the memory dedicated to the second processor, the bus of the first processor is coupled to the bus of the second processor. Apparatus associated with each bus controls the ability of the other processor to access the system bus, thereby effectively limiting access of each processor to the system resources.

More recently, interest has been demonstrated in data processing systems having a plurality of central processing units functioning with non-homogeneous (generally incompatible) characteristics. The availability of non-homogeneous central processing units can be particularly advantageous to a system user providing the availability of a plurality of program repertoires. Ideally, all of the central processing units should have a peer relationship, i.e., should be capable of accessing all resources without the benefit of auxiliary protection mechanisms described in relation to the related art and without having a master/slave relationship in which one central processing unit controls all the activity and allocation of resources. Many central processing systems do not have the necessary hardware and/or software functionality to enforce allocation of resources. Non-the-less, the peer relationship between central processing units is a desirable multiprocessor relationship, allowing easy expandability of the processing system.

A need has been felt for technique that permits any central processing unit to be coupled to a data processing system even though necessary the mechanisms for enforcement of resource allocation are not present.

SUMMARY OF THE INVENTION

It is an object of the present invention to provide an improved data processing system that overcomes the problems of the prior art.

It is a feature of the present invention to provide an improved data processing system having a plurality of central processing units.

It is another feature of the present invention to provide an improved data processing system having a plurality of central processing units utilizing different operating systems.

It is a further feature of the present invention to provide an improved data processing system in which a plurality of central processing units executing instructions under different operating systems can have a peer relationship.

It is more particular feature of the present invention to provide apparatus permitting two central processing units of a data processing system to operate in a non-hierarchical relationship while controlling the interaction between the central processing units.

It is still another feature of the present invention to permit a central processing unit to be coupled to a data processing system, in which all the central processing units have a non-hierarchical relationship, even though the central processing unit being coupled to the data processing system does not have the requisite resource allocation enforcement mechanisms.

The aforementioned and other features are attained, according to the present invention, by coupling a central processing unit, typically not compatible with a central processing unit(s) already coupled to a data processing system, to the data processing system. The non-compatible central processing unit is coupled to the data processing system through a central processing unit interface device. The central processing unit interface device includes resource allocation mechanisms by which a data processing system which can permit the coupled central processing unit(s) to have access to all of the resources of data processing system. The central processing unit interface device dynamically controls the resources to which the coupled central processing unit can have access. The central processing unit interface device also eliminates potential conflicts during initialization procedures, provides status signals relating to the operation of the non-homogeneous central processing unit and applies selected control signals to the non-compatible central processing unit.

These and other features of the invention will be understood upon reading of the following description along with the drawings.

BRIEF DESCRIPTION OF THE DRAWINGS

FIG. 1A is a block diagram of a bus oriented data processing system having a plurality of central processing units according to the related art, while

FIG. 2A illustrates the apparatus for implementing a peer processor relationship in a multiprocessor data processing system, while

DESCRIPTION OF THE PREFERRED EMBODIMENT

1. Detailed Description of the Figures

Figure 1A:
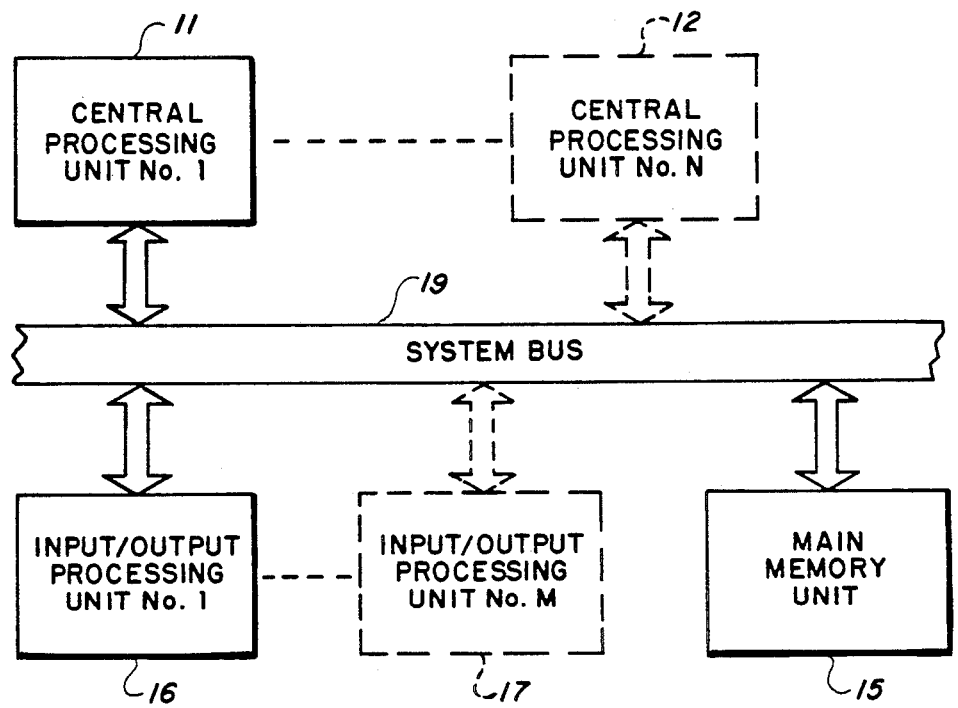
Figure 1B:
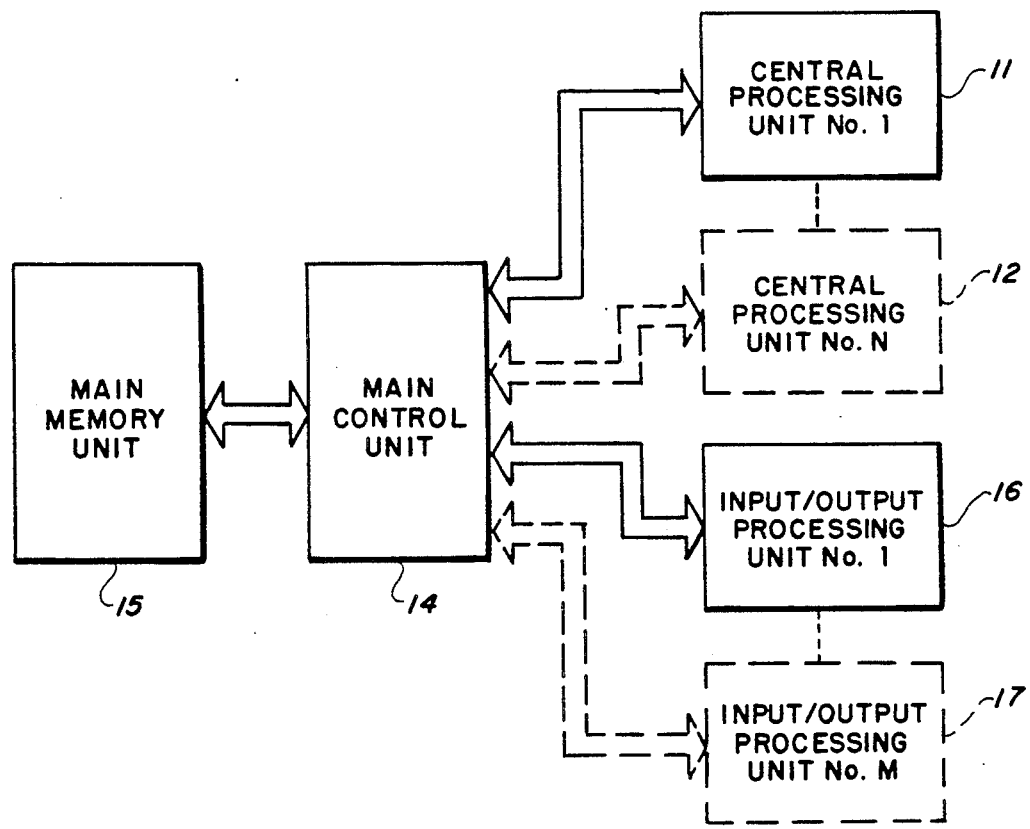
FIG. 1B is a block diagram of a memory controller oriented data processing system having a plurality of central processing units according to the related art.
Figure 2A:
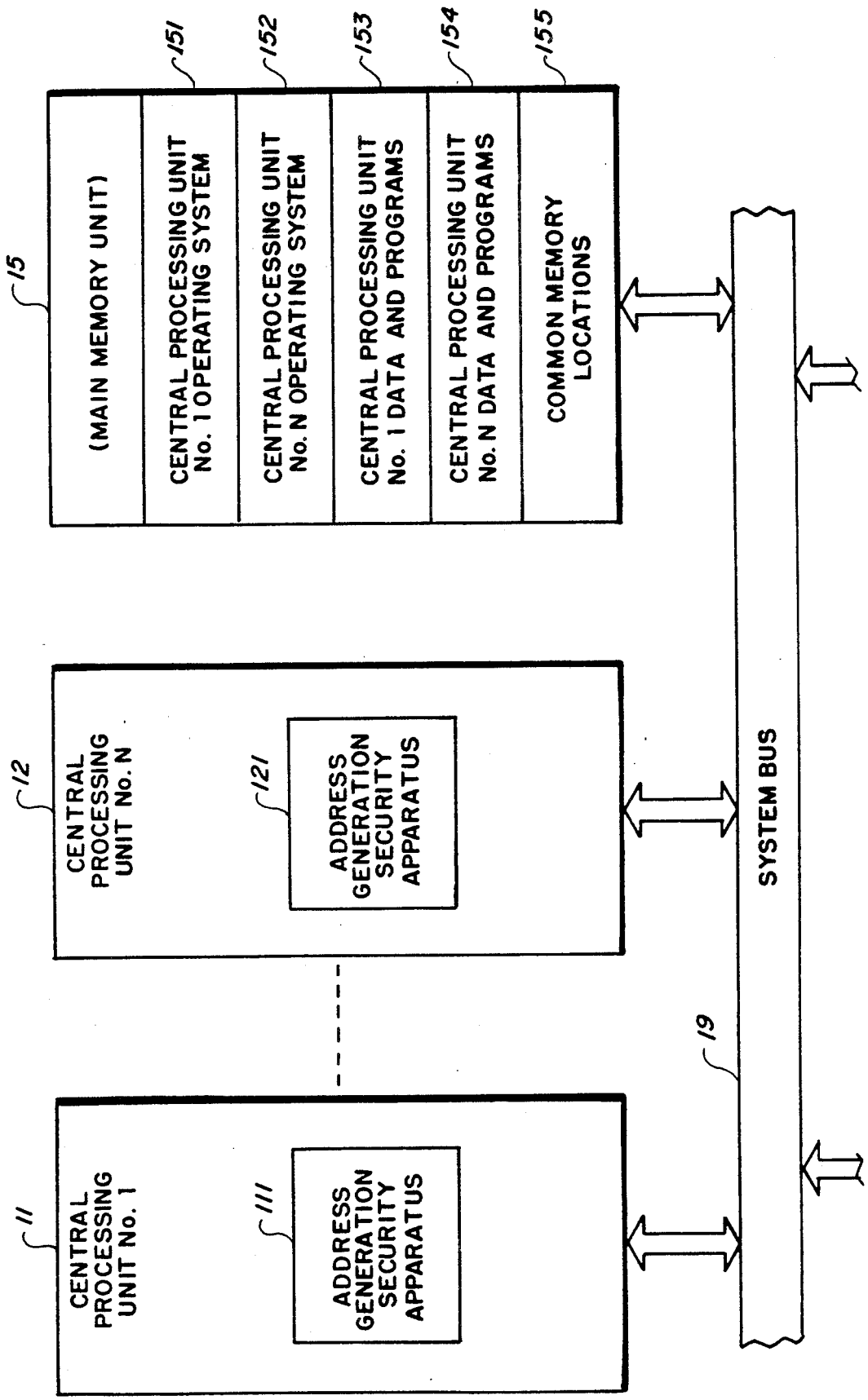

Referring to FIG. 2A, the principal components that permit the central processing units of a data processing system of multiprocessor data processing system to assume a peer relationship are illustrated. Each central processing unit 11 (through 12) has associated therewith apparatus, software procedures or a combination of apparatus and software programs that prevent the generation of addresses, or attempts to access input/output processing units or input/output devices are nominally unavailable to the central processing unit 11 (through 12 respectively). This apparatus is illustrated as address generation security apparatus 111 as part of central processing unit 11 and address generation security apparatus 121 as part of central processing unit 12 The main memory unit 15 is divided into a plurality of regions, the regions of the main memory unit 15 being illustrated for central processing unit 11 and central processing unit 12. Region 151 labelled Central Processing Unit No. 1 Operating System, is a region reserved for the operating system controlling the operation of central processing unit 11, while region 152, labelled Central Processing Unit No. N Operating System, is a portion of the main memory unit reserved for the operating system controlling operation of the central processing unit 12. The portion of the main memory unit denoted by region 153, labelled Central Processing Unit No. 1 Data and Programs, is reserved for the files, tables, software procedures, etc., used by the central processing unit 11, while the region 154, labelled Central Processing Unit No. N Data and Programs, is reserved for the files, tables, software programs used by central processing unit 12. Region 155, labelled Common Memory Locations is common region and accessible to both central processing unit 11 and central processing unit 12.

Figure 2B:
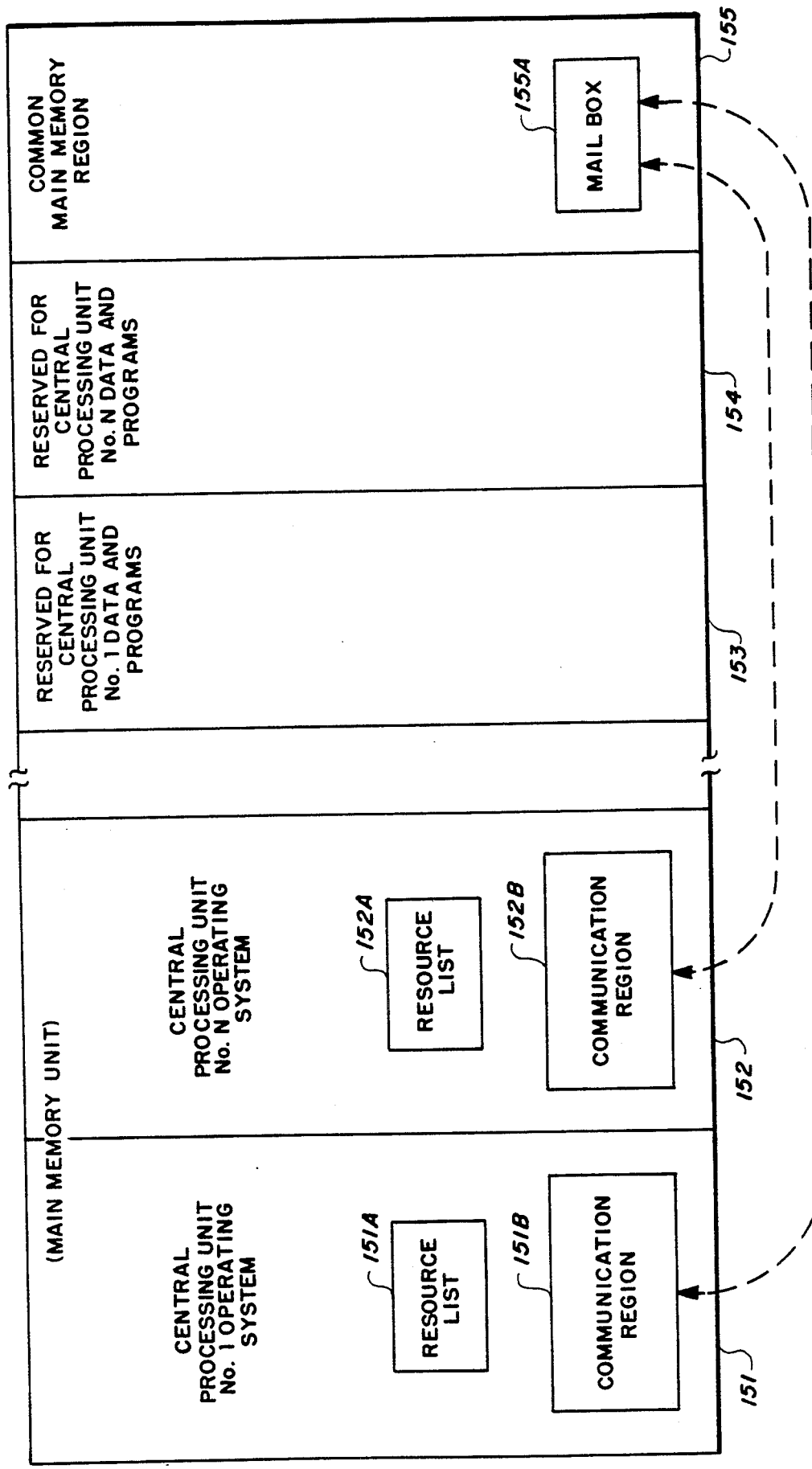
FIG. 2B illustrates the partitioning of main memory storage in a peer processor relationship.

Referring to FIG. 2B, more detail in the allocation of the storage of the main memory unit 15 is shown symbolically. The regions 151 and 152, reserved for operating systems of the associated central processing unit, each have two subregions (151A and 151B, and 152A and 152B, respectively) that are important for operation of a peer relationship. The subregions 151A, each labelled Resource List, and 152A provide a list of the resources, i.e., input/output devices and reserved main memory unit regions, reserved for the associated central processing unit. Subregions, each labelled Communication Region 151B and 152B, provide the procedure by which the two central processing systems can communicate. In the preferred embodiment, this communication is performed through subregion 155A, labelled Mail Box, of the portion of main memory reserved subregion 155A of for usage by both the central processing units 11 and 12 using a technique typically referred to as a data processing system mail box. In this technique, a message is left, i.e., stored, in the mail box 155A by a first central processing unit and a second central processing unit either reads the contents of the mail box 155A periodically or is alerted by the first central processing unit that a message is available. Upon reading of the contents of the mail box 155A, the second central processing unit can make an appropriate response.

Figure 3:
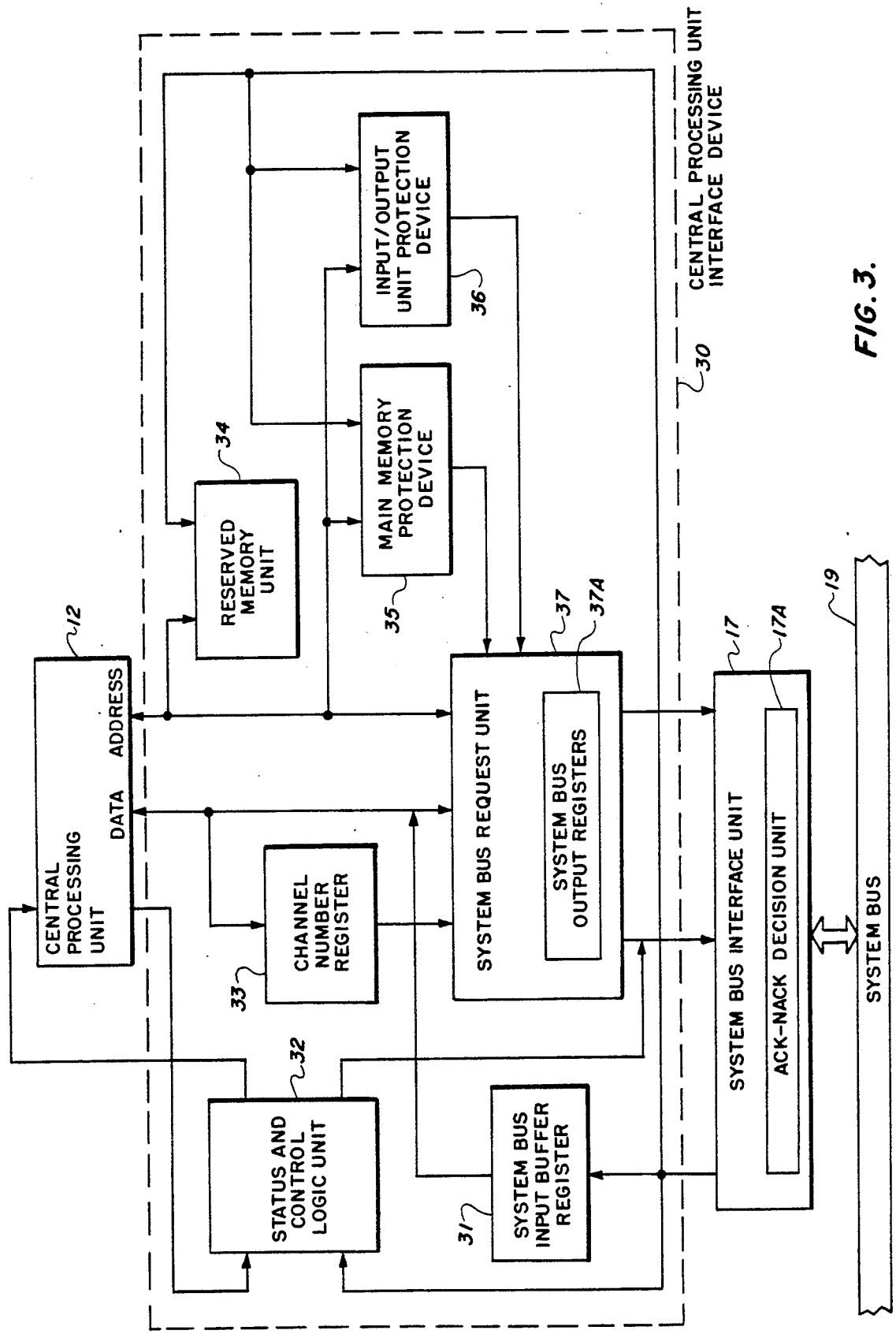
FIG. 3 is a block diagram of the principal components of the protection enforcement mechanism for the repartitioning of resources according to the present invention.

Referring now to FIG. 3, the principal components of the central processing unit interface device 30 are shown. The system bus 19 is coupled to the system bus interface unit 17. The system bus interface unit 17 has appropriate apparatus for identifying communications directed to the apparatus associated with the system bus interface unit 17 and for applying messages to the system bus 19 according to the protocol established for the system bus 19. The system bus interface unit 17 also includes ACK-NACK (ACKNOWLEDGE ACKNOWLEDGE-NOT) decision unit 17A. Communications from the system bus 19 are applied, through the system bus interface unit 17, to the system bus input buffer registers 31, the status and control logic unit 32, to the reserved memory unit 34, to the main memory protection device 35 and to the input/output protection unit 36. Signals from the status and control logic unit 32 are applied to the central processing unit 12 and to the system bus interface unit 17. The reserve memory unit 34 receives signals from the central processing unit 12 and applies (data) signals to the central processing unit 12. The main memory protection device 35 and the input/output protection device 36 receive signals from the central processing unit 12 and apply signals to the system bus request unit 37. The system bus request unit 37, which includes the system bus output registers 37A, receives signals from the central processing unit 12 and applies signals to the central processing unit 12. The channel number register 33 receives signals from the central processing unit 12 and applies signals to the system bus request unit 37.

Figure 4:
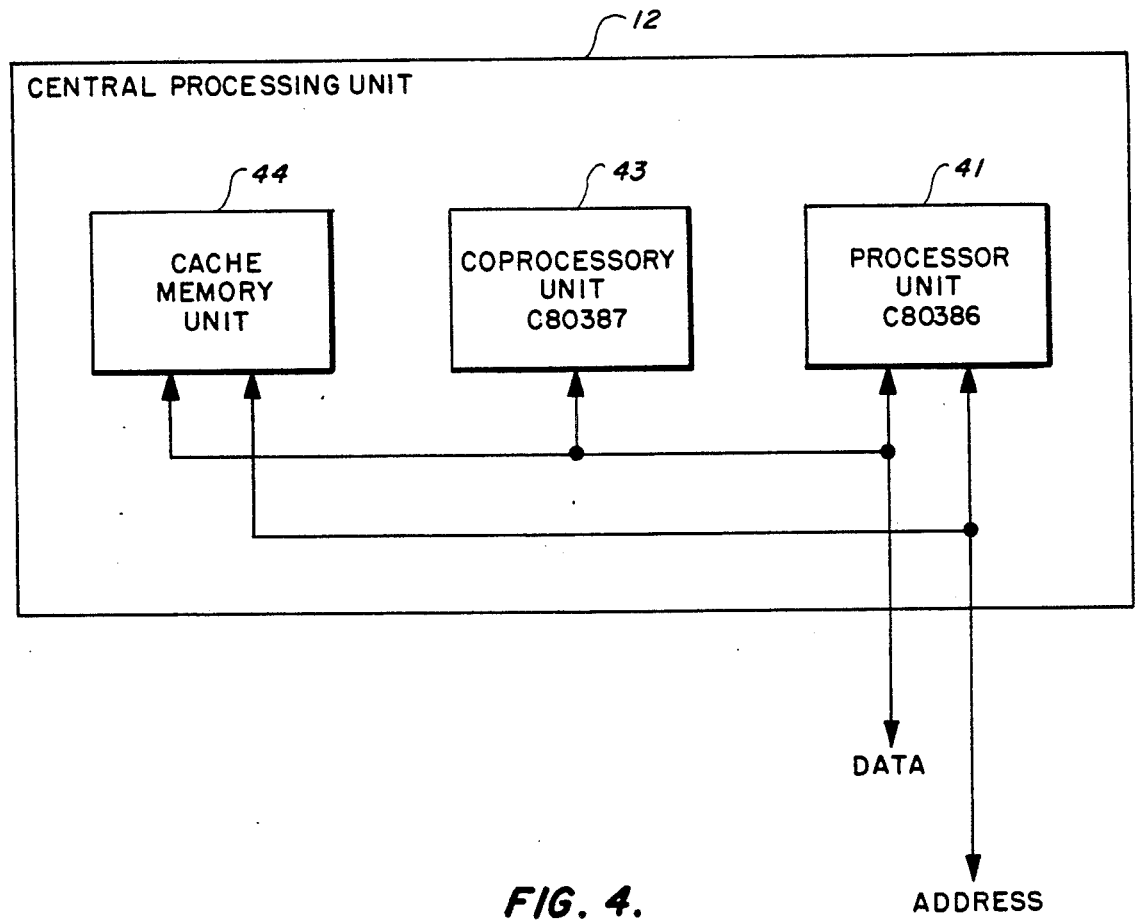
FIG. 4 is a block diagram of the central processing unit according to one implementation of the preferred embodiment.

Referring next to FIG. 4, a block diagram of the components of a central processing unit 12 used in the preferred embodiment is shown. The principal processing functions are performed by processor unit 41, an Intel 80386 component. The complex processing functions, such as floating point operations, are provided by coprocessor unit 43, implemented by an Intel 80387 component. The cache memory unit 44 provides access to the data required for processing by the central processing unit 12.

Figure 5:
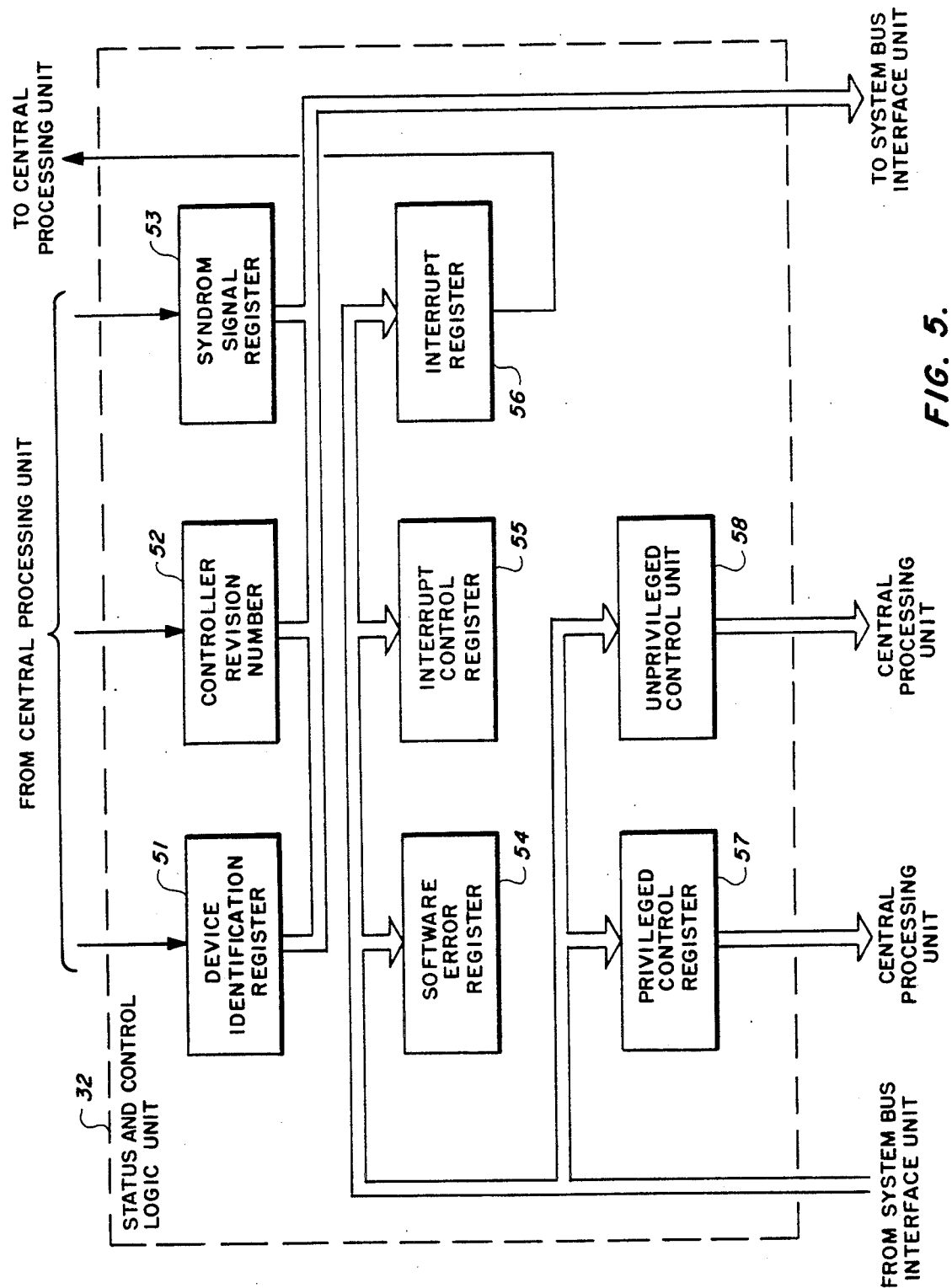
FIG. 5 is a block diagram of the status and control logic unit 32 of the protection enforcement mechanism.

Referring next to FIG. 5, a block diagram of the components of the status and control logic unit 32 are shown. The device identification register 51 contains identification information from the central processing unit 12 that is coupled to the central processing unit interface device 30. The controller revision number 52 identifies the functionality of the control unit processing interface device 30. The syndrome signal register 53 receives signals from the associated central processing unit that identify an operational event having significance for the operation of the data processing system. The contents of the device identification register 51, the controller revision number 52 and the syndrome signal register 53, in response to appropriate commands from the system bus interface unit 17, are applied to the system bus interface unit 17. The software error register 54 is a status register for the software procedures. The interrupt control register 55 includes interrupt status information such as the interrupt level of the currently executing program. Interrupt register 56 has information relating to a pending externally applied interrupt procedure identifying signals therein. The software error register 54, the interrupt control register 55 and the interrupt register 56 can have data stored therein that originate from signals in the system bus interface unit 17 and can apply the contents of the registers to the system bus interface unit 17. In addition, the interrupt register 56 applies a signal to the associated central processing unit indicating that an interrupt is pending. The privileged control register 57 and the unprivileged control register 58 contain control signals that are applied to and effect the operation of the associated central processing unit. Registers 57 and 58 receive signals from the system bus interface unit 17. In the preferred embodiment, the unprivileged control register 58 is used for control of cache memory unit 44, while the privileged control register 57 applies signals to the associated processor 41 that impacts the operation.

Figure 6:
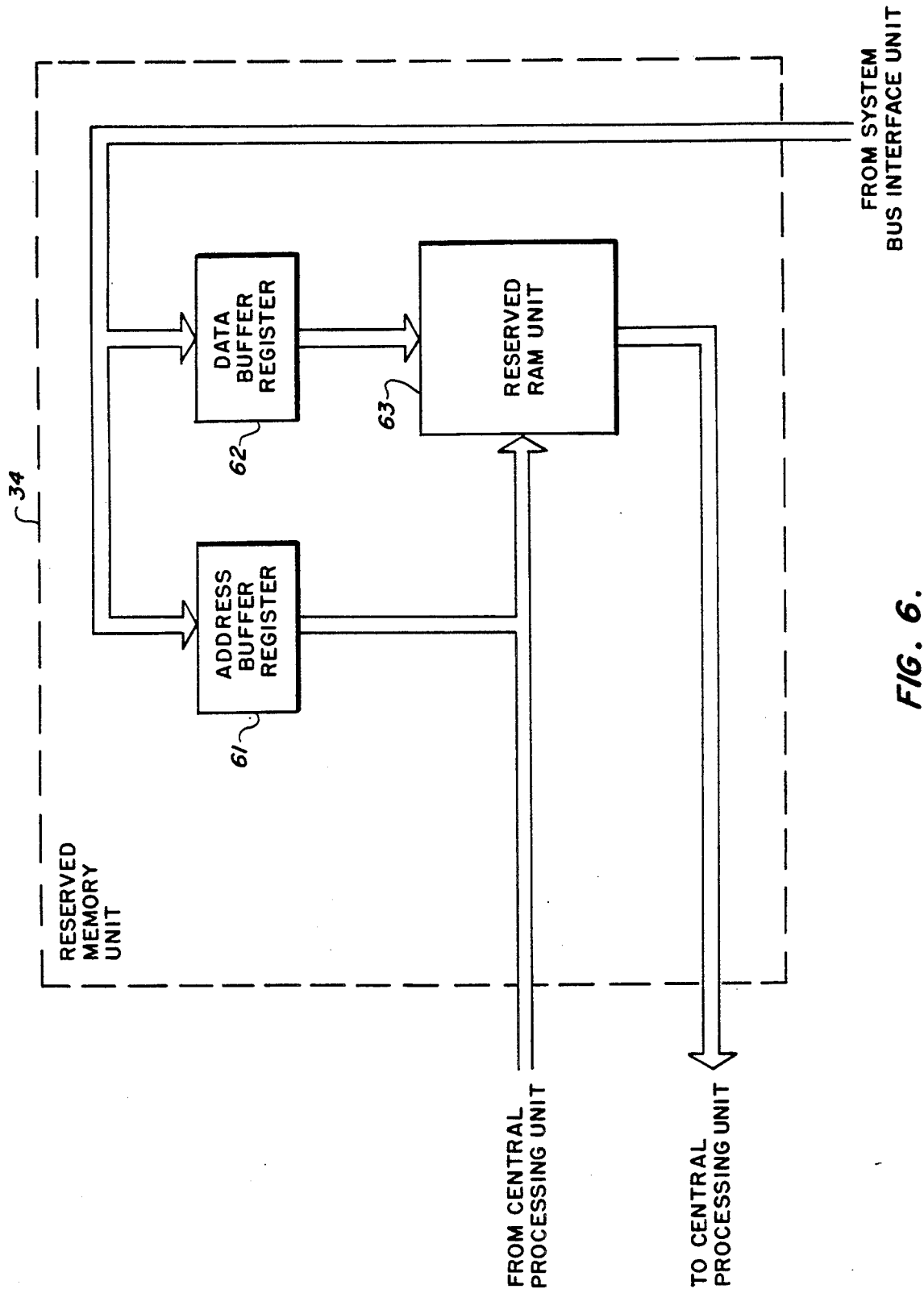
FIG. 6 is a block diagram illustrating the components of the dedicated memory unit 34 shown in FIG. 3.

Referring next to FIG. 6, the address buffer register 61 and the data buffer register 62 receive signals from the system bus interface unit 17 and apply the signals stored therein to reserved RAM (Random Access Memory) unit 63. Reserved RAM unit 63 receives address signals from the associated central processing unit and transfers data signals to the associated central processing unit. The reserved RAM unit 34 is used during the initialization procedure and is described below.

Figure 7:
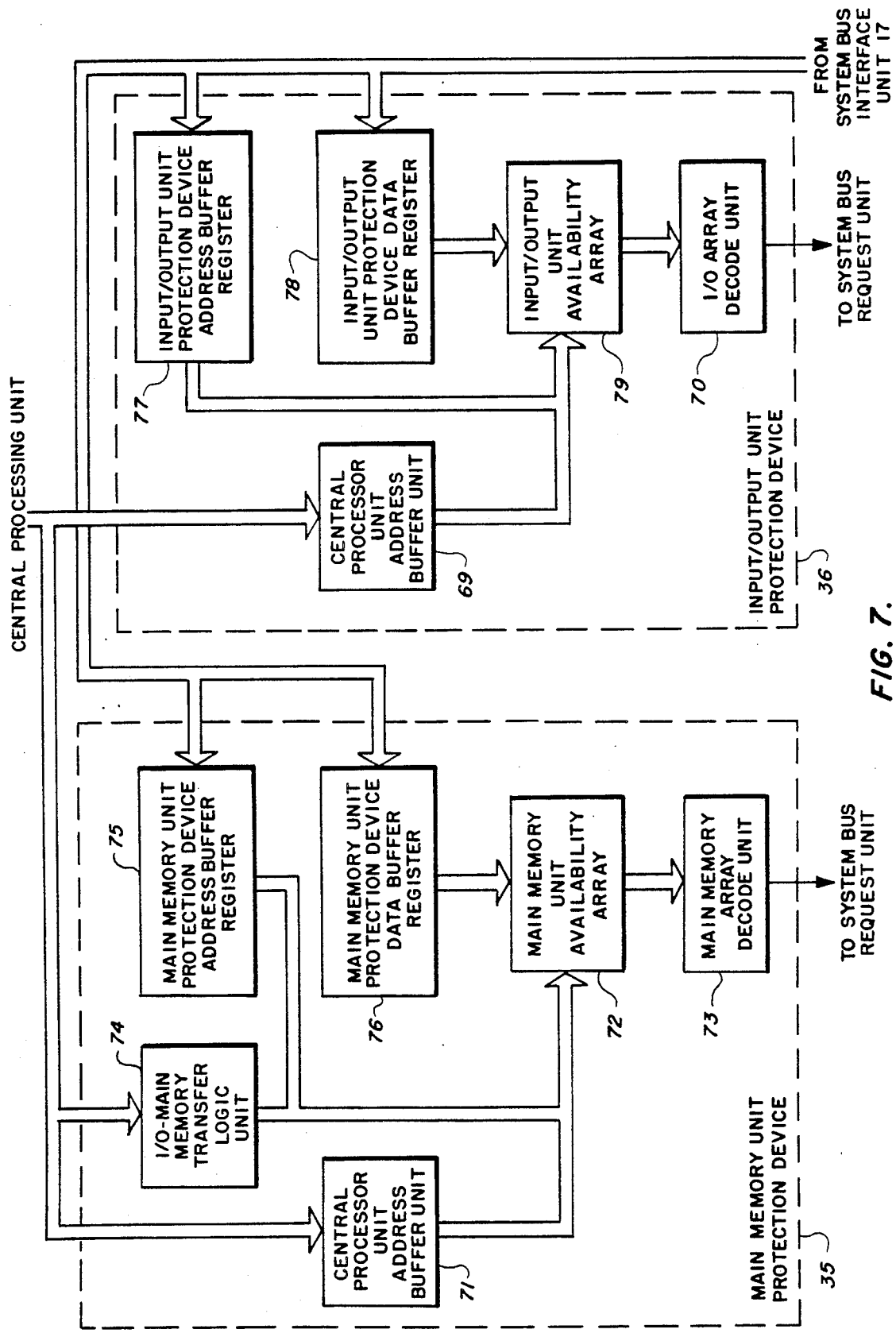
FIG. 7 is a block diagram of the components of the main memory unit protection device and the input output protection device.

Referring next to FIG. 7, a block diagram of the main memory unit protection device 35 and the input/output unit protection device 36 are shown. The input/output unit protection device address buffer register 77 and the input/output protection device data buffer register 78 receive signals from the system bus interface unit 17 and apply signals to the address input terminals and data input terminals respectively of input/output unit availability array 79. The central processing unit address buffer unit 69 receives signals from the central processing unit and applies signals to the address terminals of input/output unit availability array 79. The input/output unit availability array 79 applies signals to the I/O array decode unit 70. The signals from I/O array decode unit 70 are applied to system bus request unit 37. The main memory unit protection device address buffer register 75 and the main memory unit protection device data buffer register 76 receive signals from the system bus interface unit 17 and apply signals to the address input terminals and the data input terminals respectively of the main memory unit availability array 72. The address input terminals of main memory unit availability array 72 also receive signals from the central processing unit by means of the central processing unit address buffer register unit 71. The I/O-main memory transfer logic unit 74 receives signals from the central processing unit 12 and applies signals to the address signal input terminals of main memory unit availability array 72. The output signals from main-memory unit availability array 72 are applied to main memory array decode unit 73, the main memory array decode unit 73 applies signals to the system bus request unit 37.

2. Operation of the Preferred Embodiment

In a ideal multiprocessor data processing system configuration, all of the central processing units would have access to all the resources of the data processing system without the requirement for protection mechanisms insuring the partitioning of resources among the central processing units. However, many operating systems do not have the procedures that prevent the attempts to access a resource assigned to another processor and/or are incompatible (non-homogeneous) with the existing central processing unit(s) of the data processing system. The present invention provides the apparatus to permit an additional, non-homogeneous central processing unit to be treated by the other central processing unit(s) of a data processing system in a peer relationship, i.e., as if these protection mechanisms were present, by locating a central processing unit interface device 30 between the central processing unit 12 and the remainder of the data processing system, typically the system bus 19, the central processing unit interface device 30 providing the appropriate protection. Thus, if an updated version (release) of an operating system includes the protection mechanisms, then the (intermediate) central processing unit interface device 30 will not be necessary.

In the preferred embodiment, the host central processing unit 11 is a Honeywell Bull DPS6PLUS data processing system operating under control of the HVSI operating system. The HVS1 operating system includes procedures that provide for the trustworthiness of the system. In order to provide the data processing system with the capability of executing the wide repertoire of user programs using the UNIX operating system, the central processing unit 12, described in FIG. 4, was selected. The Honeywell Bull UCOSV operating system, based on the UNIX operating system, has been provided for executing the user programs, this operating system was believed to lack, at present, the appropriate mechanisms for secure partitioning of resources in the multiprocessor environment. The central processing unit interface device 30, illustrated in block diagram form in FIG. 3 is used to provide the protection mechanisms for the partitioning of resources.

Referring to the status and control logic unit of FIG. 5, a host processing unit can control the operation of the data processing unit coupled to central processing interface unit 30 by entering data groups in appropriate registers and can obtain information concerning the coupled central processing unit by reading data groups in the registers. The ACK-NACK decision unit 17A controls the access to the status and control logic unit 32 from the system bus 19. For example, when an attempt is made to enter an interrupt command in the interrupt register 56, the ACK-NACK decision unit 17A compares the interrupt level of the interrupt command with the current level of operation of the central processing unit 12 stored in interrupt control register 55. When the current operation level exceeds the interrupt level, then the ACK-NACK decision unit 17A applies an NACK (ACKNOWLEDGE_NOT) signal to the system bus indicating that the interrupt command signal group has not been stored in the interrupt register 56. Similarly, the ACK-NACK decision unit 17A will prevent the occurrence of possible conflicts by refusing to accept selected signal groups. In the preferred embodiment, access to the registers is typically through the system bus (by means of an I/O command). For example, the interrupt register 56 can signal to the coupled central processing unit 12 the presence of an interrupt command stored therein. For the coupled central processing unit 12 to read the contents of the interrupt register 56, a I/O procedure is used.

The reserved memory unit 34 of FIG. 6 is used during the initialization procedure. Central processing unit 12, as illustrated in the embodiment of FIG. 4 has an initialization procedure that addresses a portion of the main memory unit 15 which the DPS6PLUS central processing system uses for its initialization procedure. In addition, the 80386 processor unit 41 addresses main memory locations that are process not (currently) implemented in the main memory unit 15. Therefore, during the initialization procedures for the data processing system, the initialization procedures needed to initialize (boot) the 80386 central processing unit is transferred to the reserved memory unit 34 via the system bus 19. Thereafter, as the 80386 central processing unit begins its internal initialization procedures, although the addresses supplied from the central processing unit are main memory unit addresses, the addressed data is supplied from the reserved memory unit 34.

Referring to FIG. 7, the mechanism by which the access by the associated central processing unit 12 to data processing system resources is controlled is illustrated. The input/output unit protection device address buffer register 77 and the input/output unit protection device data buffer register 78 receive signals from the data processing system that associate an input/output device address (i.e., channel number) with the availability of that input/output device (encoded as data) to the associated central processing unit 12. The encoded availability data is stored at the appropriate address in the input/output unit availability register 79. When the associated central processing unit 12 attempts to access an input/output device, the address signals are applied to the input/output unit availability memory 79. The encoded data associated with that address is applied to the I/O array decode unit 70 and the I/O array decode unit 70 applies a signal to the system bus request unit 37 that permits or prohibits the continuation of the access of the input/output unit. Similarly, the main memory unit protection device 35 by means of the main memory unit protection device address buffer register 75 and the main memory unit protection device data buffer register 76 receive signals from the (system bus 19 of the) data processing system and store data signals encoded with information relating to the availability of the main memory unit 15 to the associated central processing unit 12. This information is stored at an address associated with a main array address in the main memory unit availability memory 72. When the associated central processing unit 12 attempts to access the main memory unit 15, the address signals are applied, through central processing unit address buffer unit register 71 to the main memory unit availability array 72. The encoded data signals associated with that main memory unit address are then applied to main memory array decode unit 73. The main memory unit decode unit 73 determines the availability of the addressed main memory location and applies appropriate signals to the system bus request unit 37. The address signals from the central processing unit 12 are stored in the system bus request unit 37 until the result of the decoding by main memory unit decode unit 73 is completed. The output signals from main memory array decode unit 73 is determines whether the access of the main memory unit 15 can continue or is terminated in the system bus request unit 37. I/O-main memory transfer logic unit 74 receives data signals from the associated central processing unit 12. In the event that an operation from the associated central processing unit 12 involves a transfer of data between an input/output unit (e.g., 16) and the main memory unit 15, the availability of the input/output device 16 can be determined by address signals. However, the main memory location is encoded in the data signals. I/O-main memory transfer logic unit 74 determines the address in the main memory unit 15 to be accessed and applies this address to main memory unit availability memory 72, thus controlling access to the main memory locations. As will be clear, this technique has the advantage that the availability of the main memory and the input/output units can be controlled, not only during an initiation procedure, but dynamically during the operation of the data processing system.

It will be clear to those skilled in the art that the peer processing configuration of the present invention relates to data processing system generally referred to as being "tightly-coupled". In this type of data processing system, the components of the data processing system are generally coupled without the intervention of a communication system or similar format translation system.

It will be clear that the presence of the central processing unit interface device 30 provides the mechanism for secure partitioning of data processing system resources which permits the associated data processing unit to have a peer relationship with the other central processing units of the data processing system. The difference in the peer relationship of the present invention is that, even though the central processing unit which enters the data to be stored in the central processing unit interface device does not control the central processing unit associated with the central processing unit interface device 30 in the sense of a master/slave relationship, the data entering data processing unit, because its partitioning mechanism, is secure (trustworthy). The central processing unit interface device 30 in response to the signals from the entering associated central processing unit, provides the secure (trustworthy) partitioning mechanism that is not present in the associated central processing unit.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A data processing system, said data processing system including a plurality of central processing units having a peer relationship, said data processing system comprising:
   signal transfer means for distributing signals applied thereto throughout said data processing system;
   a first central processing unit coupled to said signal transfer means, said first central processing unit applying signals to and receiving signals from said signal transfer means;
   a plurality of data processing system resources, said resources being coupled to said signal transfer means for applying signals thereto and for receiving signals therefrom, a first group of said resources being assigned to said first central processing unit for use by said first central processing unit, wherein said first central processing unit includes security apparatus for preventing access to resources not assigned to said first central processing unit;

a second central processing unit operating under control of an operating system which is non-homogeneous with an operating system controlling said first central processing unit, said second central processing unit having a second group of resources assigned thereto;

interface means coupled between said second central processing unit and said signal transfer means, said interface means including apparatus for permitting access by said second processing unit only to said second group of resources; and resource allocation means for dynamically reassigning said data processing system resources in response to signal groups from a central processing unit requiring a non-assigned data processing system resource.

2. The data processing system of claim 1 wherein said interface means includes access control means for dynamically changing said second group of resources to which said second central processing unit is permitted access.

3. The data processing system of claim 2 wherein said access control means is responsive to signals from said first central processing unit for determining said second group of resources to which said second central processing unit is permitted access.

4. The data processing system of claim 3 wherein said interface means includes memory means for storing initiation procedures for said second data processing system.

5. The data processing system of claim 1 wherein said interface means includes register means for storing control signals from said first central processing unit and for transferring said control signals to said second central processing system.

6. The data processing system of claim 5 wherein said control signals include an interrupt signal and identification signals identifying an interrupt procedure.

7. The data processing system of claim 1 wherein said interface means includes register means for receiving and storing status signals from said second central processing unit, said interface means including signal transmission means for transmitting said status signals to said first central processing unit in response to request signals from said first central processing unit.

8. The data processing system of claim 1 wherein said interface means includes interface apparatus coupled to said signal transfer means for providing signal groups to and for receiving signal groups from said data processing system which are compatible with signal groups transferred over said signal transfer means.

9. A central processing unit interface device for coupling a first central processing unit to a data processing system in a peer relationship, said data processing system having a second central processing unit controlled by a non-homogeneous operating system coupled to said data processing system, said data processing system including system resources to which access by said first and said second central processing unit is required, said data processing means including system transfer means for transferring signal groups between system resources (such as main memory locations and I/O units) and said central processing units, each central processing unit having a group of system resources dynamically allocated in response to signal groups exchanged between central processing units wherein a one central processing unit requests allocation of a resource not currently allocated thereto, said interface device comprising:

first signal transfer means for receiving data, instruction, and control signals from and for applying data, instruction, and control signals to said first central processing unit;

second signal transfer means for receiving signals from and for applying signals to said system transfer means;

main memory protection means responsive to main memory reference signals received from said first central processing unit identifying a main memory resource to which access by said first central processing unit is required, said main memory protection means determining when an identified main memory resource identified by said main memory reference signals is allocated to said first central processing unit, said main memory reference signals being applied to said second signal transfer means for transfer to said identified main memory resource when said main memory resource is allocated to said first central processing unit; and I/O protection means responsive to I/O commands from said first central processing unit identifying an I/O resource to which access by said first central processing unit is required, said I/O protection means determining when an identified I/O resource identified by an I/O command is allocated to said first central processing unit, said I/O command being applied to said second signal transfer means for transfer to said identified I/O resource when said identified I/O resource is allocated to said first central processing unit.

10. The central processing unit interface device of claim 9 wherein said main memory protection means and said I/O protection means are responsive to and store control data signal groups applied to said second signals transfer means from said system transfer means, said control data signal groups determining when a main memory resource and when an I/O resource is allocated to said first central processing unit.

11. The central processing unit interface device of claim 10 wherein said main memory protection means and said I/O protection means are responsive to and store control data signals from said second central processing unit, said control data signals selected from the group consisting of resource allocation control signals and interrupt control data signals.

12. The central processing unit interface device of claim 10 further comprising reserved memory means for storing initialization procedures for said first central processing unit, wherein main memory reference signals from said first central processing unit are applied to said reserved memory means during said initialization procedures.

13. The central processing unit interface device of claim 12 further comprising status and control means for storing status signals from said first central processing unit, wherein said first central processing unit status signals are applied by said first signal transfer means to said system transfer means for interrupting operation of said second central processing unit, said status and control means for storing control signals from said second central processing unit, said second central processing unit control signals controlling operation of said first central processing unit.

14. The central processing unit interface device of claim 13 wherein said status and control means includes an interrupt register for storing a pending interrupt data signal group for said first central processing unit.

15. The central processing unit interface device of claim 14 wherein said first central processing unit receives signals from said interrupt register through said first signal transfer means.

16. The central processing unit interface device of claim 13 wherein said status and control means includes an interrupt control register for storing logic signals related to a current level of priority of operation of said first central processing unit.

17. The central processing unit interface means of claim 14 wherein apparatus of said status and control means can store logic signals from and transfer logic signals to said central processing unit in response to commands from said second central processing unit.

18. A method of coupling a first central processing unit to a data processing system in a peer relationship with other central processing units of said data processing unit, said first central processing unit operating under control of an operating system that is incompatible with an operating system of a second central processing unit of said data processing system, said data processing system including data processing system resources (such as main memory unit locations and I/O units) and a system transfer means for exchanging signals among said resources and said central processing units, the method comprising the steps of:
coupling an interface unit between said first central processing unit and said system transfer means;
assigning a first group of resources to said first central processing unit, identification of said first group of resources being stored in said interface unit, wherein a requested resource can be assigned to said first group of resources in response to communications between said first and said second central processing units;
when said first central processing unit generates signal groups which would result in interaction with a destination resource when applied to said system transfer means, applying said signal groups to said interface unit;
determining in said interface unit whether said destination resource is included in said first group of resources;
when said destination resource is included in said first group of resources, converting said signal groups to a format compatible with system transfer means signal groups and applying said converted signal groups to said system transfer means; and
when said destination resource is not in said first group of resources, prohibiting said signal groups from being applied to said system transfer means.

19. The method of coupling a first central processing unit to a data processing system of claim 18 wherein said assigning step is responsive to requests for data processing system resources from said second central processing unit coupled to said system transfer means.

20. The method of coupling a first central processing unit to a data processing system of claim 19 further comprising the step of providing a communication channel between said first and said second central processing units wherein said central processing units can dynamically reallocate assigned system resources.

21. The method of coupling a first central processing unit to a data processing system of claim 20 further comprising the step of initializing said first central processing unit by means of first central processing unit initiation signal groups stored in said interface unit.

22. The method of coupling a first central processing unit to a data processing system of claim 19 further comprising the steps of:
transmitting control signals controlling operation of said first central processing unit from said second central processing unit and storing said control signals in said interface unit, said control signals stored in said interface unit being transferred to said first central processing unit; and
transferring from said first central processing unit and storing in said interface unit status signals indicating a status of said first central processing unit, said status signals being applied to said system transfer means.

* * * * *